United States Patent [19]

Houghton

[11] Patent Number: 5,036,795
[45] Date of Patent: Aug. 6, 1991

[54] MODULAR CAGE STRUCTURE

[76] Inventor: Paul Houghton, 16230 Skyline Blvd., Woodside, Calif. 94062

[21] Appl. No.: 345,435

[22] Filed: May 1, 1989

[51] Int. Cl.[5] ............................................. A01K 1/00
[52] U.S. Cl. ..................................... 119/17; 119/19; 52/127.6
[58] Field of Search ...................... 119/15, 17, 19, 20; 446/115, 478; 52/127.8, 106, 127.6

[56] References Cited

U.S. PATENT DOCUMENTS

| Re. 18,273 | 12/1931 | Freer | 119/17 |
|---|---|---|---|
| 1,258,684 | 3/1918 | Johnson | 119/17 |
| 1,667,998 | 5/1928 | Woodworth | 119/17 |
| 2,068,210 | 1/1937 | Walker | 119/17 |
| 3,381,664 | 5/1968 | Barlocci | 119/18 |
| 3,556,058 | 1/1971 | Smiler | 119/17 |
| 3,742,909 | 7/1973 | Yellin | 119/17 |
| 3,875,902 | 4/1975 | Gasper | 119/17 |
| 4,016,833 | 4/1977 | Ray | 119/17 |
| 4,471,720 | 9/1984 | Hedeson et al. | 119/17 |

FOREIGN PATENT DOCUMENTS

| 2154193 | 5/1973 | Fed. Rep. of Germany . | |
| 2554678 | 5/1985 | France . | |
| 1025311 | 4/1966 | United Kingdom | 119/17 |
| 151267 | 5/1978 | United Kingdom | 119/17 |

OTHER PUBLICATIONS

M.A.C. Associates, "Primates Only Used Equipment List", Apr. 29, 1986, 5 pages.
Bush Products, "For Group 4 Primates", Date unknown, 2 pages.

*Primary Examiner*—John G. Weiss
*Attorney, Agent, or Firm*—Irell & Manella

[57] ABSTRACT

A modular cage design providing a variety of environments and stimuli for primates or other animals, including a front panel, a rear panel, and a side panel switch are hinged or interlocked together. Where hinges are used, side panels are held together by longitudinal rods, which are threaded on each end, and which pass through bores provided in the front and rear panels. The front and rear panels are fixed to the side panels by nuts threaded onto the rods.

A sliding panel is provided, attached to handles which are accessible from outside the cage, for sliding forwardly, to move the primate towards the front of the cage.

Doors are provided on one end panel, in either a swinging or sliding configuration, for access to the interior to the cage.

The side panels are adjustable for forming multi-cage environments. In one embodiment, hooks are used, and the side panels are provided with angles, such that reversing a given side panel changes the overall shape of the cage. In multi-cage configurations, rectangular connecting passages are formed, which are closed off by rectangular end panels.

The cage materials are preferably lightweight, multicolored and primate-proof, and provided with a variety of differently shaped apertures, for varying the environment of the primate. The modularity of the design allows individual elements of the cage to be interchanged freely, further providing environmental variety.

In some embodiments, the cage is mounted on a cone or bar, about which it may freely rotate, providing an exercise function. A brake is provided to prevent rotation when desired.

30 Claims, 4 Drawing Sheets

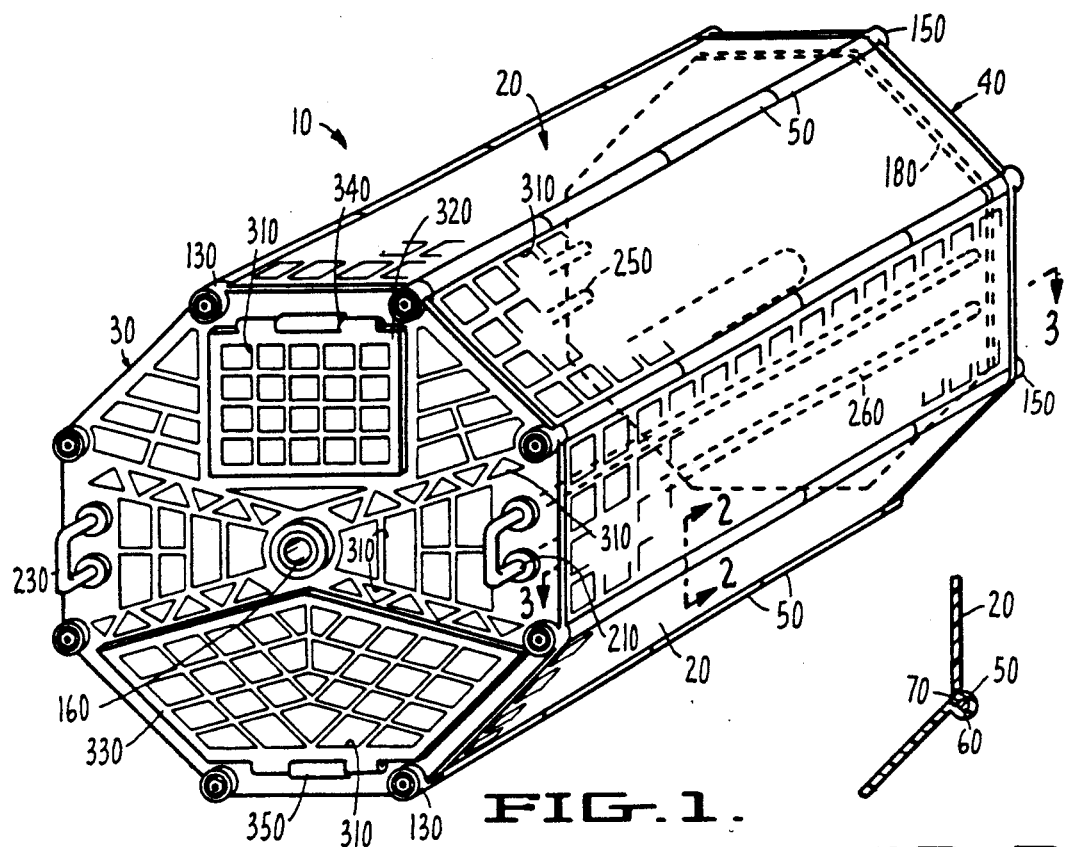
FIG. 1.
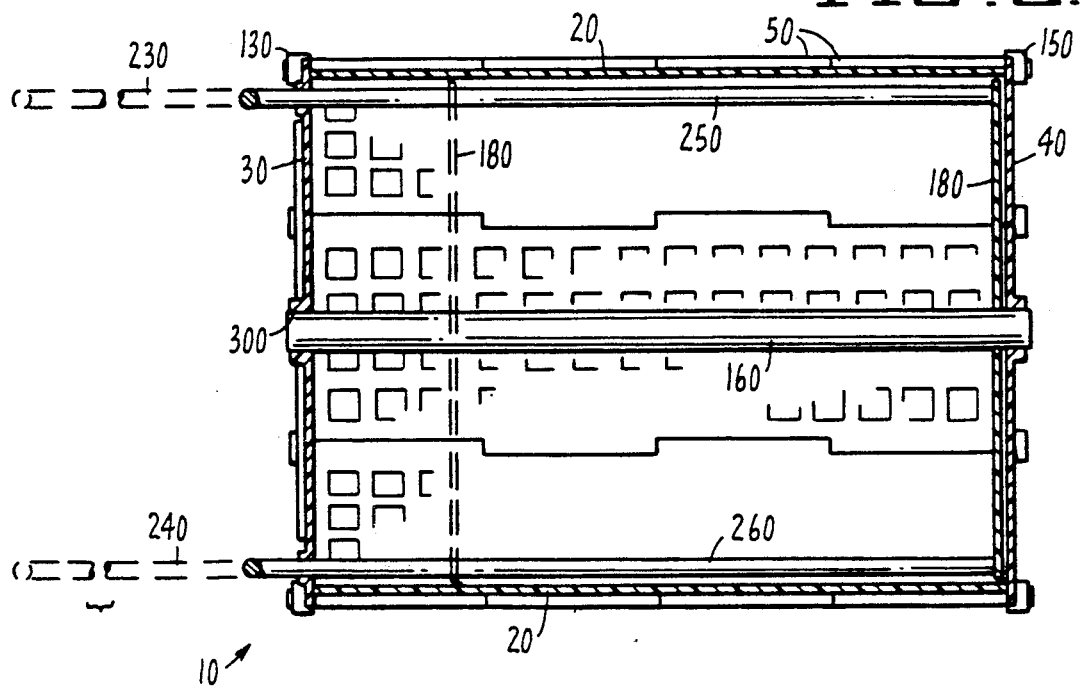
FIG. 2.
FIG. 3.

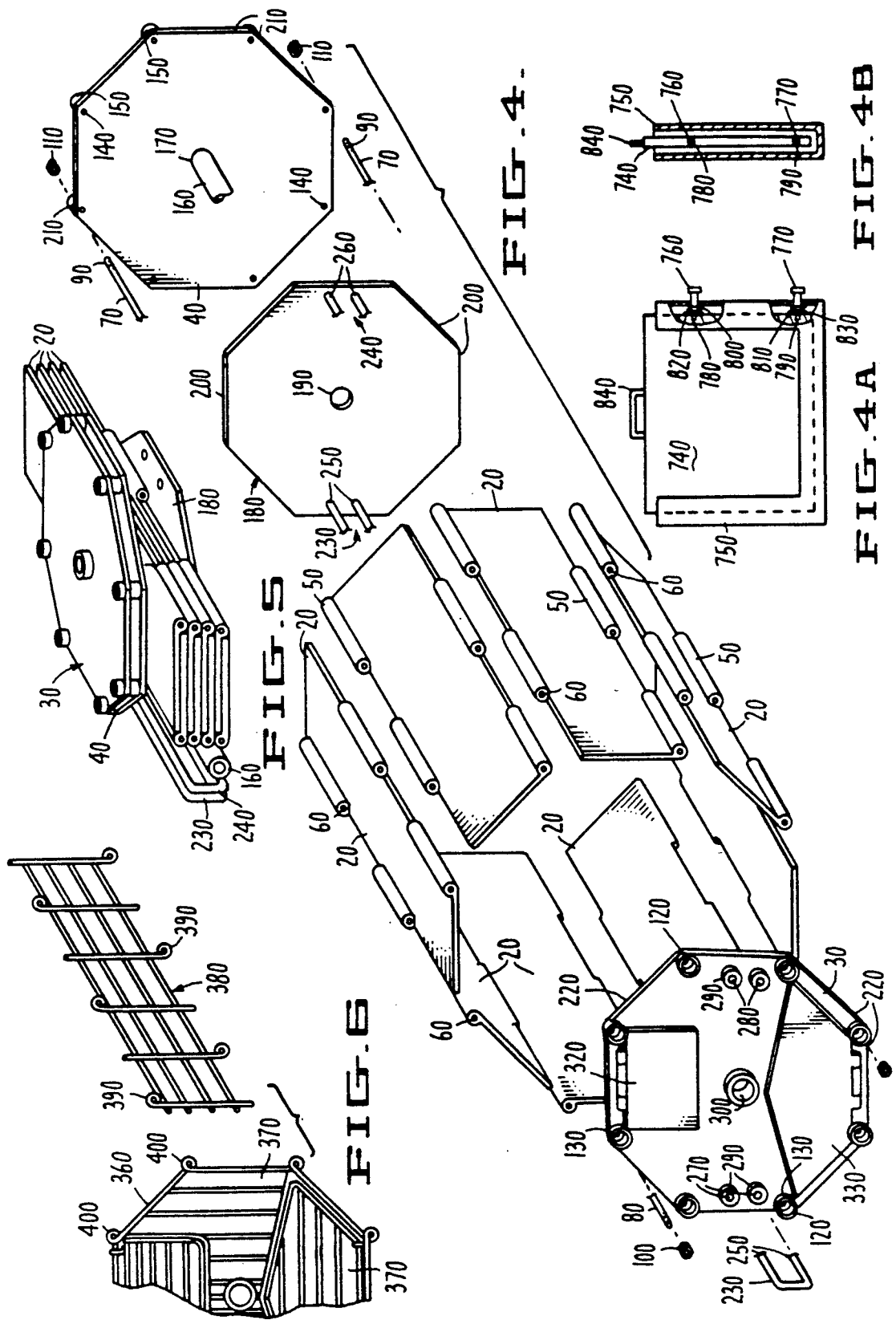

MODULAR CAGE STRUCTURE

FIELD OF THE INVENTION

This invention relates to a cage structure for nonhuman primates which is modular in design, and which provides a variety of environments and stimuli for the enrichment of the primary environment and the subsequent psychological well-being of the primates. The cage design may also be used for other animals.

BACKGROUND OF THE INVENTION

There is a variety of types of cages presently available for use in caging primates. A characteristic of many such cages presently available is that they are highly functional in nature, serving to house the primates and act as living quarters without providing significant adaptability, storage or environmental enrichment.

There is an increasing awareness that primates require a stimulating environment in order to sustain a healthy psychological state. Thus, there is a need for primate cages with greater capability for environmental enrichment in order to facilitate psychological well-being. There is also a need for providing primates with exercise, preferably at any time the primate wishes.

One drawback of cages presently available is that they do not provide such environmental variety. Another lack in present cages is that they are not adaptable to be used in different sizes and shapes, and do not provide the exercise capability mentioned above.

Another drawback of many cages presently in use is that they are not versatile, being constructed in a manner which allows only one configuration of the cage, and not allowing for easy disassembly and storage. Thus, there is a need for a cage design which may be easily disassembled and compactly stored, and which is adaptable into a variety of cage configurations, for both functional and aesthetic purposes. There is also a need for such a cage design which may be made of lightweight materials of different colors, patterns, textures and smells.

SUMMARY OF THE INVENTION

Accordingly, it is an object of the present invention to provide a cage for nonhuman primates which provides a great variety of stimulating environments. The invention comprises a modular cage formed of interlocking panels which may be interchanged with one another, so that a variety of panels may be used and changed at will, having various different textures, smells, and colors, and being formed from a range of different materials. The panels are connected by hinges which are either rotatable or reversible with respect to one another, so that many different single- and multi-cage configurations may be achieved utilizing a small number of modular components.

The reversible hinges include hooks for interlocking with one another, such that a single hinge may be used in at least two different positions for altering the angles of side panels of the cage with respect to one another. In one embodiment, rotatable hinges are provided which allow a range of different relative angles for the side panels.

The hinges are configured to allow many such side panels to be connected together, along with end panels of the cages, for forming large social group or family-type housing for the animals. These configurations are adaptable into many different sizes and shapes for accommodating different housing requirements.

In some embodiments, a single cage of the invention may be used as an exercise cage by mounting it rotatably on a shaft or a frustoconical support, carried either on a movable rack or on a wall mount.

The cages of the invention are easily disassembled into their modular components for storage and transport. The modularity of the components also allows for easy and inexpensive replacement of damaged, old or otherwise undesirable components by new components, without replacing the entire cage structure.

BRIEF DESCRIPTION OF THE DRAWINGS

FIG. 1 shows a primate cage according to the teachings of this invention.

FIG. 2 shows a close-up for one type of hinge for use in the cage of FIG. 1.

FIG. 3 is a sectional view taken along line 3—3 of FIG. 1.

FIG. 4 is an exploded view of the cage of FIG. 1.

FIGS. 4A–4B show an alternative embodiment of the door of FIGS. 1 and 4.

FIG. 5 is a view of the cage of FIG. 1 in a disassembled configuration, with the components stacked for moving or storage.

FIG. 6 shows an alternative embodiment to certain elements to the cage of FIG. 1.

BRIEF DESCRIPTION OF THE PREFERRED EMBODIMENTS

Figure 7:
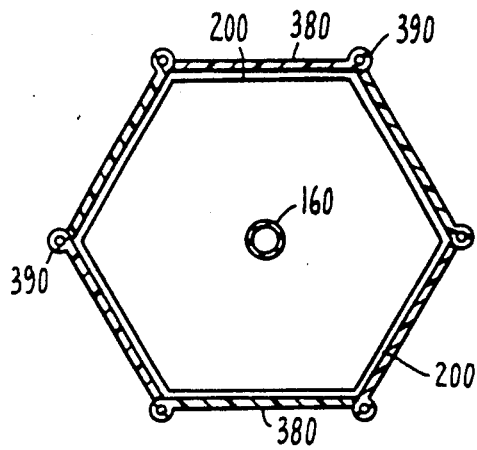
FIG. 7 is an end view of an alternative embodiment to the cage of FIG. 1.

FIG. 1 of the drawings shows a cage 10 according to the invention, an exploded view of which is shown in FIG. 4. The cage 10 is formed from a plurality of side panels 20, and two end panels 30 and 40.

In the embodiment of FIGS. 1 and 4, the side panels 20 include hinges 50, which mesh or interlock with one another as shown in FIG. 1. The hinges 50 include central bores 60, which lie collinear with one another when the cage is assembled as in FIG. 1. In the embodiment shown, four such hinges 50 lie collinear to one another when the cage is assembled, and a rod 70 having a first threaded end 80 and a second threaded end 90 is positioned within the bores 60 is positioned therein, as described below.

Figure 9:
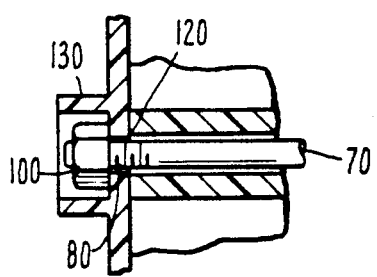
FIG. 9 is a partial sectional view taken along line 9—9 of FIG. 8.

The front end panel 30 includes a plurality of bores 120 therethrough, as shown in FIGS. 4 and 9, with each bore 120 being surrounded by an annular rim 130.

Similarly, the back end panel 40 includes a plurality of bores 140, each such bore 140 being surrounded by an annular rim 150, as shown in FIG. 4. The rims 130 and 150 may be formed in unitary fashion with the panels 30 and 40, respectively, or may be mounted thereon by welding, adhesive, threading, or other conventional means.

When the cage is in its assembled configuration shown in FIG. 1, each rod 70 is positioned within the central bores 60 of the hinges 50, with its ends 80 and 90 protruding through the bores 120 and 140, respectively, which are aligned collinearly with the bores 60. A nut 100 is threaded onto the end 80, and another nut 110 is threaded onto the end 90. The diameters of the bores 120 (see FIG. 9) and 140 are preferably slightly larger than the diameters of the rods 70, but smaller than the outer diameters of the nuts 100 and 110, so that the nuts perform a clamping action of the ends 30 and 40, and of the side panels 20 therebetween. Preferably, each of the nuts, rods and bores 60 are of uniform design.

Carried within the cage 10 is a central rod or perch 160, which is fixed at its back end 170 to the panel 40. A sliding panel 180 is also carried within the cage 10, and includes a central bore 190, which fits over the rod 160 and is provided with sufficient clearance with respect to the diameter of the rod 160 to allow the panel 180 to slide forwardly and backwardly relative to the panel 140. However, the diameters of the bore 190 and the rod 160 should be sufficiently close that edges 200 of the panel are substantially aligned with edges 210 of the panel 40, and with edges 220 of the panel 30, as shown in FIG. 7, and similarly shown for the alternative embodiment of FIG. 8. In the embodiment shown in FIGS. 1, 4 and 8, each of the panels 30, 40, and 180 is octagonal in shape.

Attached to the panel 180 is a pair of handles 230 and 240, preferably diametrically opposite the central bore 190. The handles 230 and 240 include at least one (but preferably two) bars 250 and 260, respectively, as shown in FIG. 4. The panel 30 includes bores 270 and 280 for receiving the bars 250 and 260, respectively, each bore 270 and 280 being surrounded by an annular rim 290. The diameters of the bores 270 and 280 should be slightly larger than the diameters of the bars 250 and 260, for allowing the bars 250 and 260 to slide easily therein.

The cage 10 is assembled as follows. The handles 230 and 240 are attached to the panel 30 by sliding the bars 250 and 260, respectively, through the bores 270 and 280. The bars 250 and 260 are then attached to the panel 180 in a conventional manner. This may be done by means of bores, threads on the ends of the bars 250 and 260, and nuts, just as the rods 70 are attached to the panel 40. It may also be accomplished by welding or other conventional means of attachment. Such attachment means is not separately shown in the drawings.

The side panels 20 are assembled in the configuration of FIG. 1 between the front and back end panels 30 and 40, and rods 70 are slid through the bores 120, 60, and 140, and nuts 100 and 110 are threaded onto the threaded ends 80 and 90. The bore 190 is, as mentioned above, slid over the rod 160 for assembly, and the rod 160 has a forward end which rests in a bore 300 of the panel 30 when the cage 10 is assembled, as shown in FIG. 3.

The annular rims 130 and 150 are utilized to prevent the caged animal from reaching outside of the cage, and unscrewing the nuts 100 and 110. Other means for preventing access to the nuts 100 and 110 may be used.

As shown in FIG. 1, each of the side panels 20 and end panels 30 and 40 has a crossbar or other configuration which allows a good deal of ventilation and vision through the panels, while restricting the primate to the cage. The materials for the end and side panels may be any of a wide variety of materials and may preferably be of variously colored strong plastic, with a range of different shapes for the apertures 310 which are formed in the panels, such as squares, rectangles, trapezoids, triangles, and the like, as shown in FIG. 1. This provides environmental variety for the primates within the cages, and thus makes for more contented and stimulated primates. Although apertures 310 are omitted from FIGS. 4, 4A and 4B for the sake of simplicity, such apertures are also preferably provided in these embodiments.

Other useful materials for the panels include glass-filled nylon and various metals. Plastics, nylon and the like have the advantage that they are rust-free, and other such rust-free materials may be chosen.

Referring to FIG. 1, the front panel 30 includes one or more doors such as doors 320 and 330. Door 320 is rectangular in shape and is attached to the panel 30 by a conventional hinge 340. Door 330 is pentagonal in shape and is attached to the panel 30 by another conventional hinge 350.

The doors may also be of a sliding or "guillotine" design, in which case a pair of tracks is provided, one for each side of the door, and an end stop is provided, upon which the door rests while it is closed. Such an embodiment is shown in FIGS. 4A–4B, wherein door 740 is mounted in a track 750, and the track being mounted on the front end panel 30. The door 740 may be pulled upwardly to open the cage, and in its lower, closed position shown in FIG. 4A, the door is held in place by pins 760 and 770. The pins 770 extend through bores 780 and 790, respectively, in the door 740, and are maintained in position by springs 800 and 810 which engage flanges 820 and 830, respectively, of the pins 760 and 770. When a keeper wishes to open the door 740, he or she pulls back on each of the pins, which are carried in the track 750, and then pulls on the handle 840. A lock (not separately shown) is provided to prevent an animal from pulling the pins out and opening the door.

When a keeper wishes to bring the primate within the cage to the front of the cage, either for transfer out of the cage or for inoculation shots or the like, he pulls the handles 230 and 240, such that the panel 180 slides along the rod 160 towards the panel 30. This confines the primate to a smaller volume, until it is directly adjacent the panel 30 and its doors 320 and 330. This "squeeze cage" function is shown in FIG. 3, wherein the dotted lines show the 230 and 240 and the panel 180 in a forward position.

FIG. 5 shows the various components of the cage in a compact, disassembled, stacked fashion. It will be appreciated that these components may be interchangeable with other components, such that the primates may be provided with an ever-changing environment, simply by replacing one or more components of the cage 10 with different components of different materials, colors, patterns, or the like. FIG. 5 demonstrates the facility with which the cage or elements thereof may be stored, interchanged or cleaned, since the cage parts are removable one by one. This is of especial usefulness in maintaining the sanitation of the cages. It is also helpful, in order to maintain sterility, if nonporous materials are utilized for the cage elements.

Examples of such different patterns are shown in FIG. 6, which shows an alternative front end panel 360, which may be formed of bar steel, wire, plastic, or the like. It will be seen that the apertures 370 are quite differently shaped from those of the embodiment of FIG. 1. The material from which the panel 360 is formed may be painted, covered with colored plastic, or otherwise provided with different textures and colors. Similarly, an alternative side panel 380 is shown in FIG. 6, having a similar structure to that of the panel 360. The side panel 380 includes loops 390, and the front panel 360 includes loops 400, which coact with similar loops or bores on the back end panel in this embodiment, in the same fashion as with the bores 60 and bores 120, for assembling the cage.

For any of the panels, doors, or other elements of the cage configurations herein, it is preferable to provide a changing variety for the enrichment of the living areas. Textures for the materials may include soft or fuzzy surfaces; or differing structural materials such as polypropylene, PVC or polycarbonate; or different shapes of apertures such as bars, squares, diamonds, and circles. Also, varying odors may be provided for the primates, and different colors are preferably chosen. By interchanging the elements of the cages at different times, many different combinations of may be constructed, creating a great many different environments for the primates, with a minimal amount of effort and expense for each such change.

Figure 8:
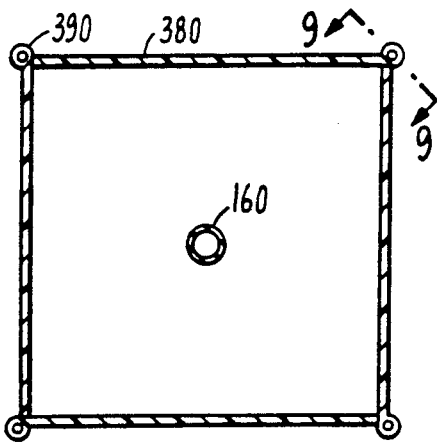
FIG. 8 is an end view of another alternative embodiment to the cage of FIG. 1.

FIG. 8 shows a square cross-section embodiment of the invention, similar to the embodiments of FIGS. 6 and 7, and with similarly numbered elements.

Figure 10:
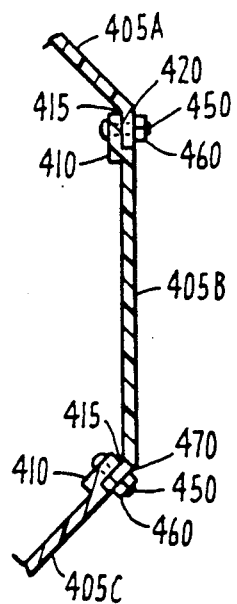
FIG. 10 is a partial sectional view showing an alternative hinging mechanism for the cage of FIG. 1.

FIG. 10 shows an alternative structure for attaching the side panels, which in this embodiment are numbered 405A, 405B and 405C. The panels are provided with overlapping flanges 410 and 420, the flanges being provided with central bores 430 and 440, respectively, for accommodating bolts 450. The bolts have threaded ends which accommodate nuts 460, whereby the panels 20 are affixed to one another. It will be appreciated that the top panel 20 in FIG. 10 may be rotated 180 degrees, such that it extends to the right instead of the left, from the point of view of that figure. The panels 405 shown in FIG. 10 preferably include angles 415, which in the preferred embodiment are angles of 135 degrees.

Figure 11:
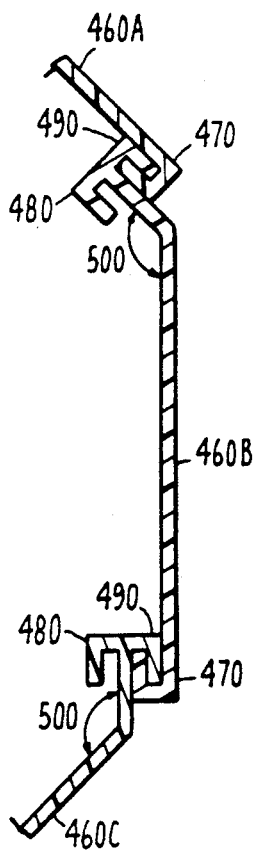
FIGS. 11-12 are partial sectional views showing another alternative hinging arrangement for the cage of FIG. 1.
Figure 12:
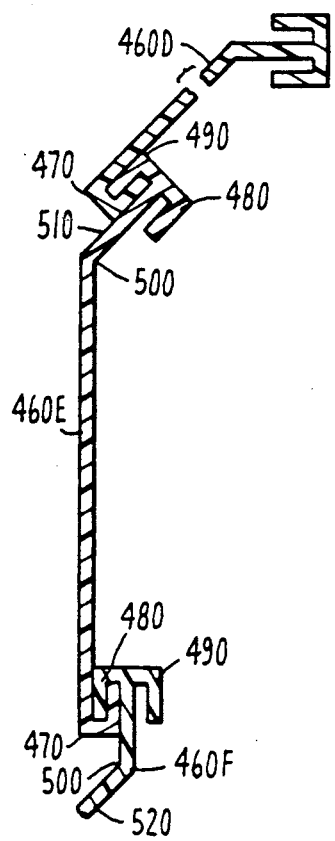

Yet another structure for attaching the side panels together is shown in FIGS. 11 and 12, wherein 35 side panels 460A-F are shown (referred to generally as panels 460). Each panel 460 includes a reflex portion or hook 470 at one end, and a double-reflex portion or double hook with hooks 480 and 490 at the other end. An angle 500 is formed in each panel 460, which in the preferred embodiment is 135 degrees. Other angles may be used, depending upon the desired cross-section. For instance, for a hexagonal cage (see FIG. 7) an angle of 120° may be used; and in general, for a regular polygonal cross-section, angle 500 will equal $(180-(360/N))$ degrees, where N is the number of sides of the cage.

It will be appreciated that the panels 405 and 460 include means for receiving rods 70, such as hinges 50 of panels 20 or loops such as loops 390 of panels 380 (see FIG. 6), although these are not separately shown in FIGS. 10-12.

In order to assemble the cage utilizing the panels 460, the hooks 490 are interlocked with the hooks 470, such that, utilizing eight such panels, a completed cage configuration such as FIG. 4 is achieved. However, the center panel 460B shown in FIG. 11 may be reversed such that its hook 470 interlocks with the hook 480 (rather than hook 490) of the lower panel 460C. In this configuration, shown for panels 460D-F in FIG. 12, the angle 500 angles the double hook of the center panel 460E shown in FIG. 12 in the opposite direction from the configuration of FIG. 11, so that the upper portion 510 of the central panel 460E is substantially parallel with the lower portion 520 of the lower panel 460F.

In this configuration, the hook 470 of the upper panel 460D may be interlocked with either the hook 480, as shown in FIG. 12, or with the hook 490, which will affect the angle which the double hook (not shown) of the panel 460D forms relative to the panel 460E.

With the variability provided by the embodiments of FIGS. 10-12, many different patterns of the cages herein may be achieved. For instance, in the configuration of FIG. 12, the structure shown at the bottom of FIG. 13 may be achieved. With the configuration shown in either FIG. 10 or FIG. 11, the structure shown at the upper portion of FIG. 13 (relating to panels 460A-460C) is achieved. Thus, a great variety of multi-level, multi-room cage configurations may be achieved, as shown for example in FIGS. 3 and 14. This variety is extremely useful when it is necessary to increase cage size and expand floor space, for pairing, social grouping or family housing for the primates. This is especially useful for dealer applications, where in general a greater amount of floor space is need than for research purposes; however, the system of the invention accommodates both types of needs because of its versatility.

In the multi-cage configurations, square end panels 530 are utilized, and are fastened along with panels 30 and 40 at each end of the longitudinal passages 540, so as to completely enclose the cage structure.

The configurations of hinges and loops shown in FIGS. 1 and 6-8 are best suited for metal structures, whereas the connecting structures shown in FIGS. 10-12 are equally suitable for metal or plastic or some other material.

Figure 14:
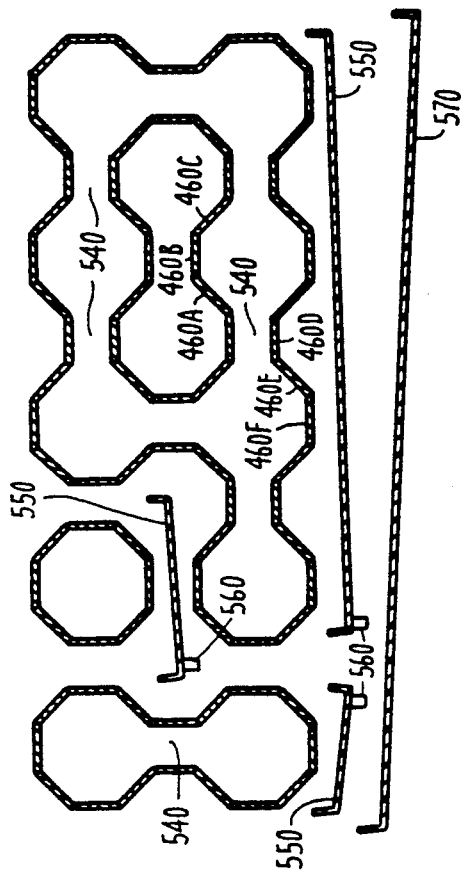
FIG. 14 shows an array of modular cages according to the invention, in a larger housing configuration.
Figure 13:
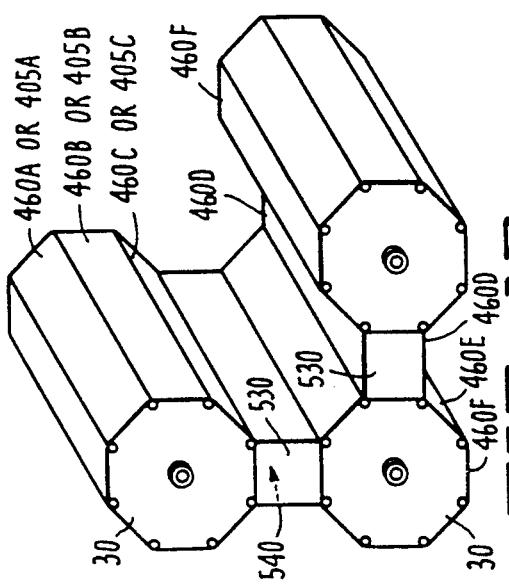
FIG. 13 shows a modular cage according to the invention in a three-cage configuration.

The embodiments of FIGS. 13 and 14 are preferably wall mounted, such that the support rods 160 protrude from a wall. Alternatively, a cone mount such as that in FIG. 16 may be utilized; however, the exercise function of FIG. 16 is achieved only when the cages are in the single-cage configuration.

In the embodiment of FIG. 14, waste trays 550 are provided, and are preferably angled towards drains 560, such that materials dropped therein will drain into a bottom waste tray 570.

In order to achieve the configuration shown in FIGS. 13-14 utilizing the embodiment of FIGS. 1 and 4, the panels 20 may simply be rotated with respect to one another. That is, rather than unbolting the panels, such as panels 405 in FIG. 10, or reversing and rehooking panels, such as panels 460 in FIGS. 11 and 12, the panels may easily swivel with respect to one another. Thus, forming a maze or other configuration such as in FIG. 14 is quite easy with the embodiment of FIGS. 1 and 4.

Figure 16:
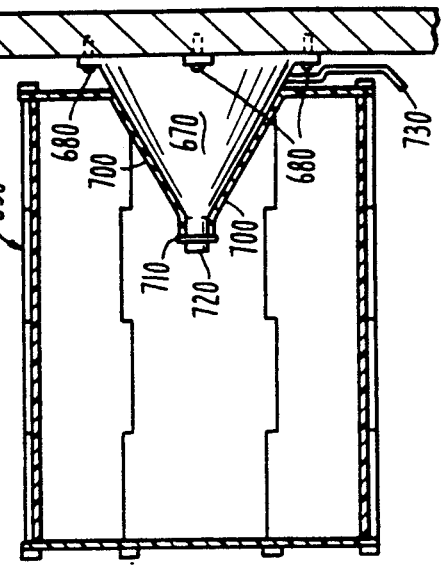
FIG. 16 shows a cage according to the invention in another exercise configuration.
Figure 15:
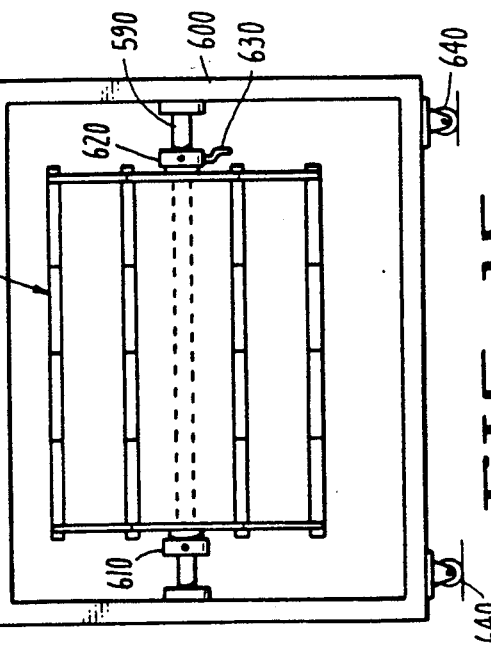
FIG. 15 shows a cage according to the invention in a moveable rack configuration.

Other embodiments are shown in FIGS. 15-16, wherein the cages may also double as exercise cages. Thus, in FIG. 15, cage 580 is mounted on a bar 590, about which it may freely rotate. The bar 590 is rigidly carried on a cart 600 or other support. Bearings 610 and 620 are provided for the cage 580 to reduce friction as it rotates relative to the bar 590. Thus, a primate in the cage 580 may freely run within the cage as it rotates. A brake 530 may be attached to the bearing 620, and is of a conventional design, providing friction against the bar 590 to prevent the cage 580 from rotating. The cart 600 may include wheels 640 for transportability.

In the embodiment of FIG. 16, the cage 650 is mounted on a wall 660 by means of a mounting cone 670. The cone 670 is mounted by means of bolts 680 which are bolted through brackets 690 to the wall 660.

The cage 650 includes a frustoconical portion 700 with a bearing 710 which surrounds a cylindrical portion 720 of the mounting cone 670. The portion 700 conforms closely to the shape of the cone 670 and may be lubricated or otherwise provided with means for reducing friction therebetween.

A hand brake 730 is provided, which may be a conventional brake mounted on the mounting cone 670 and engaging both the cone 670 and the cage 650 to prevent them from moving with respect to one another.

When the hand brake 730 is not engaged, the cage 650 is free to rotate relative to the cone 670, in similar fashion to the cage 580 relative to the bar 590. Thus, cage 650 is also an exercise cage, which may be held stationary at any time. As indicated above, many variations on the present design are possible. Besides the octagons and squares discussed above, hexagons and other configurations may be made, in each case preferably providing at least one flat floor.

Among the many advantages of the present invention is the fact that a wide variety of cages may be built using a relatively small number of components. These cages may be made of lightweight materials, such that storage of the components is facilitated by both the lightness of the materials and their compactness when collapsed.

It will be appreciated from the above that the modularity of the cage of the present invention serves both functional and aesthetic purposes. Providing a variety of different cage configurations enriches the environment of the primates in the cages, and allows the cage to be modified to include several primates, with the greater amount of volume that would be necessary.

What is claimed:

1. An animal cage, comprising:
   a first end panel;
   a second end panel;
   a plurality of side panels;
   first means for attaching said first end panel to said side panels;
   second means for attaching said second end panel to said side panels;
   third means for attaching said side panels to one another;
   wherein said third means has a variable configuration for allowing a plurality of cages to be attached to one another in a modular fashion to form multi-cage configurations for providing varied environments for animals, said configurations including a multilevel structure wherein each said cage constitutes one module of said structure, wherein said side panels are configured such that, for said multilevel structure, each module thereof includes a floor.

2. The cage of claim 1, wherein:
   said third attachment means includes at least one hinge attached at each of two sides of each said side panel, and further includes means for maintaining hinges of adjacent said side panels in a fixed configuration with respect to one another and to said first and second end panels, said hinges being adapted for rotating adjacent said side panels with respect to one another for attachment to further side panels for forming said multi-cage configurations.

3. The cage of claim 2, wherein:
   said first attachment means includes a first bore;
   said second attachment means includes a second bore;
   each said hinge includes a third bore; and
   said third attachment means includes a rod positioned within said first, second and third bores, and further includes means for maintaining said rod within said bores.

4. The cage of claim 3, wherein said maintaining means includes threaded ends on said rod and nuts for threading onto said threaded ends.

5. The cage of claim 1, wherein at least some of said first and second bores include means for preventing an animal from disengaging said first, second and third attachment means.

6. The cage of claim 4, wherein at least some of said first and second bores include means for preventing an animal from disengaging said nuts.

7. The cage of claim 6, wherein said preventing means comprises an annular rim surrounding each said first and second bore.

8. The cage of claim 1, wherein said side panels include first and second ends at an angle with respect to one another.

9. The cage of claim 8, wherein each said side panel includes a first bore and a second bore which are on said first and second ends, respectively, and said third attachment means includes bolts for insertion through said bores and nuts for fixing said bolts in place, with each said side panel being attachable to another said side panel in at least two different positions, for providing a variety of single-cage and multi-cage configurations.

10. The cage of claim 8, wherein said third attachment means includes a first hook carried at said first end of each said side panel and a second hook and a third hook carried at said second end of each said side panel, with each of said second and third hooks for interlocking with one said first hook.

11. The cage of claim 1, including means for rotatable attachment to a support structure, for allowing said cage to be rotated by an animal for providing exercise.

12. The cage of claim 11, wherein said rotatable attachment means includes a bar upon which said cage is supported.

13. The cage of claim 12, wherein said bar is situated along a central axis of said cage, and is positioned within at least one central bore in one of said end panels.

14. The cage of claim 13, wherein said means for rotatable attachment includes a mounting cone attached to said support structure and a frustoconical portion of one said end panel for mounting on said cone.

15. The cage of claim 11, wherein said support structure comprises a cart for portability of said cage.

16. The cage of claim 1, wherein at least some of said end panels and side panels include apertures of varying sizes and shapes.

17. The cage of claim 1, wherein at least some of said end panels and side panels are formed from metal.

18. The cage of claim 1, wherein at least some of said end panels and side panels are formed from glass-filled nylon.

19. The cage of claim 1, further including:
   an interior panel slidably carried on an interior of said cage; and means for sliding said interior panel relative to said first and second end panels.

20. The cage of claim 8, wherein said angle is 135 degrees, and wherein said cage in a single-cage configuration is octagonal in cross-section.

21. The cage of claim 3, wherein said maintaining means comprises welds.

22. The cage of claim 6, wherein said preventing means comprises a cap over each of said nuts.

23. The cage of claim 18, wherein at least some of said end panels and side panels are formed from glass-filled nylon.

24. The cage of claim 18, wherein at least some of said end panels and side panels are formed from a plastic.

25. The cage of claim 18, wherein at least some of said end panels and side panels are formed from a polymer.

26. The cage of claim 18, wherein some of said end panels and side panels have textures which differ from one another.

27. The cage of claim 18, wherein some of said end panels and side panels have odors which are different from one another.

28. The cage of claim 20, wherein said cage in a single-cage configuration is hexagonal in cross-section.

29. The cage of claim 20, wherein said cage in a single-cage configuration is square in cross-section.

30. An animal cage, comprising:
a first end panel;
a second end panel;
a plurality of side panels connected to said end panels, each said side panel including hinges on two sides thereof for interlocking with hinges of other said side panels, wherein said hinges on each said side panel are of a standard configuration for interchangeability of said side panels one at a time, wherein said hinges have a variable configuration for allowing a plurality of cages to be attached to one another in a modular fashion to form multi-cage configurations for providing varied environments for animals, said configurations including a multilevel structure wherein each said cage constitutes one module of said structure, wherein said side panels are configured such that, for said multilevel structure, each module thereof includes a floor.

* * * * *